US006926308B2

(12) United States Patent
Penn et al.

(10) Patent No.: US 6,926,308 B2
(45) Date of Patent: Aug. 9, 2005

(54) TOILET PAPER, PAPER TOWEL AND FACIAL TISSUE

(75) Inventors: Daniel Joel Penn, Cincinnati, OH (US); Michael Charles Penn, Chicago, IL (US); Amir Nathaniel Penn, Chicago, IL (US)

(73) Assignees: Daniel J. Penn, Long Beach, CA (US); Michael C. Penn, Chicago, IL (US)

( * ) Notice: Subject to any disclaimer, the term of this patent is extended or adjusted under 35 U.S.C. 154(b) by 7 days.

(21) Appl. No.: 10/399,250

(22) PCT Filed: Oct. 16, 2001

(86) PCT No.: PCT/US01/32222

§ 371 (c)(1), (2), (4) Date: Apr. 15, 2003

(87) PCT Pub. No.: WO02/32670

PCT Pub. Date: Apr. 25, 2002

(65) Prior Publication Data

US 2004/0003521 A1 Jan. 8, 2004

Related U.S. Application Data

(60) Provisional application No. 60/241,196, filed on Oct. 17, 2000.

(51) Int. Cl.[7] ........................ D21H 27/00; B65H 18/28; B32B 27/12

(52) U.S. Cl. ............................. 283/56; 283/49; 283/51; 283/60.1; 283/60.2; 283/903; 402/79; 40/309; 40/493; 40/503; 242/160.1; 242/610.1; 242/899; 162/109; 162/112; 162/113; 162/123; 162/110; 162/361; 162/362; 960/961

(58) Field of Search ............................. 283/49, 51, 56, 283/60.1, 60.2, 903; 402/79; 40/309, 493, 503; 242/160.1, 610.1, 899; 162/109, 112, 113, 123, 110, 361, 362; 493/960, 961

(56) References Cited

U.S. PATENT DOCUMENTS 5,123,343 A * 6/1992 Willer ......................... 101/23
5,478,279 A * 12/1995 McCormick ................. 462/25
5,802,974 A * 9/1998 McNeil ....................... 101/226
5,820,730 A * 10/1998 Phan et al. ................. 162/112
5,833,789 A * 11/1998 Rosendale et al. .......... 156/227
6,089,483 A * 7/2000 St-Laurent ............... 242/160.4
6,203,663 B1 * 3/2001 Kamps et al. .............. 162/109
6,221,211 B1 * 4/2001 Hollenberg et al. ......... 162/123
6,631,574 B2 * 10/2003 Okyere ......................... 40/309
6,655,618 B1 * 12/2003 Emmerich ............... 242/160.1
2001/0040371 A1 * 11/2001 Dahlquist .................... 283/51
2003/0221348 A1 * 12/2003 Morrison ...................... 40/638
2003/0232168 A1 * 12/2003 Fearn et al. ............... 428/42.3
2003/0234305 A1 * 12/2003 Cole ....................... 242/160.1
2004/0118530 A1 * 6/2004 Kressner et al. ............ 162/109
2004/0241432 A1 * 12/2004 Hollander ................... 428/343
2004/0258887 A1 * 12/2004 Maciag et al. .............. 428/156

FOREIGN PATENT DOCUMENTS

WO WO0102254 A2 * 1/2001

* cited by examiner

*Primary Examiner*—Derris Banks
*Assistant Examiner*—Mark Henderson
(74) *Attorney, Agent, or Firm*—Michael C. Penn

(57) ABSTRACT

Toilet paper, paper towel and facial tissue products (10) are presented. Information may be placed, through printing or embossing, on the toilet paper, paper towels and facial tissues. The information (62) may comprise advertisements, coupons, prizes (such as stickers and crossword puzzles), games or other promotional materials. In addition, information (62) may be placed on a sheet separate from the toilet paper and/or paper towels and/or facial tissues. The information sheet may be then be placed in conjunction with the toilet paper, paper towel or facial tissue by rolling or by interleaving (16) the information sheet with the toilet paper, paper towel or facial tissue. In another aspect, different information may be place on two or more sheets to convey a story (39) or other information. The information (72) may, for example, be used to help potty train children, or to teach children numbers or the alphabet.

17 Claims, 10 Drawing Sheets

TOILET PAPER, PAPER TOWEL AND FACIAL TISSUE

REFERENCE TO RELATED APPLICATIONS

This application claims priority benefits to U.S. provisional application Ser. No. 60/241,196, filed on Oct. 17, 2000. This application hereby incorporates by reference, in its entirety, U.S. provisional application Ser. No. 60/241, 196, filed on Oct. 17, 2000.

BACKGROUND OF THE INVENTION

The present invention relates to materially modified and enhanced toilet paper, paper towel and facial tissue products based on specific information (as described below) or materials used on or in combination with toilet paper, paper towel and facial tissue products.

Toilet paper, paper towel and facial tissue products are, by design, utilitarian in nature. The purposes for these products are obvious, and the advancements in the toilet paper, paper towel and facial tissue product arts have been limited to their utilitarian purposes. For instance, the focus of much of the advancements in toilet paper arts have been in the area of increased softness (e.g., quilting, two-ply, etc.) for a more pleasant feel against one's skin or in the area of pleasing appearance (designs printed or embossed on the toilet paper). Likewise, the advancements in the paper towel product arts have been limited to its utilitarian purposes such as increased durability, softness, or pleasing appearance.

However, toilet paper, paper towels and facial tissue have a myriad of uses that have not been fully exploited by the prior art. One example is in the area of toilet training. It is a difficult task to train a child to stop relying on diapers, and to begin using the toilet. One manner in which to ease the transition during toilet training is to tailor the design of the toilet paper for a child. However, the toilet paper in the prior art does not address this specific need. Another example is the potential informational or educational aspects associated with toilet paper/paper towels. Toilet paper in the prior art have not taken advantage of the tremendous opportunity in conveying information or educating people while they are in the process of using toilet paper. Likewise, paper towels have a variety of information and educational uses which have not been exploited by prior art paper towels. Moreover, many applications for facial tissues have not been fully utilized.

SUMMARY OF THE INVENTION

In one aspect of the invention, information is placed, through printing or embossing, on the toilet paper and/or paper towels and/or facial tissues. The information may comprise advertisements, coupons, prizes (such as stickers and crossword puzzles), games or other promotional materials.

In another aspect of the invention, information is placed in conjunction with toilet paper and/or paper towels and/or facial tissues. In one embodiment, the information is placed on a sheet separate from the toilet paper and/or paper towels and/or facial tissues. The information sheet is then placed in conjunction with the toilet paper and/or paper towel by rolling the information sheet with the toilet paper and/or paper towel. The information may comprise indicia such as advertisements, coupons, prizes (such as stickers and crossword puzzles), games or other promotional materials.

In a second embodiment, the information is placed on a sheet separate from the toilet paper and/or paper towels and/or facial tissues. The information sheet is then interleaved with the toilet paper and/or paper towels and/or facial tissues so that upon dispensing sheet(s), an information sheet(s) is also dispensed.

In another embodiment, different information is placed on two or more sheets to convey a story or other information. The information may, for example, be used to help potty train children, or to teach children numbers or the alphabet.

In another embodiment, information is placed every so many sheets to indicate to a child when to tear the toilet paper.

In yet another embodiment, a roll of toilet paper comprises cutouts. The cutouts may be used to help reinforce a learning message provided by the sheets of paper. The cutouts may, for example, be figures, numbers, letters, or coupons, advertising or any other information.

DETAILED DESCRIPTION OF THE PRESENTLY PREFERRED EMBODIMENTS

Toilet paper, paper towel and facial tissue products have a variety of uses beyond what has been exploited by the prior art. Specifically, toilet paper, paper towel products and facial tissues may be used for conveying information for educational, personal, entertainment and commercial purposes, and such other purposes that encourage certain behavior or simply advance the distribution of information.

All of which are uses that extend beyond the utilitarian nature of toilet paper, paper towels and facial tissues.

Figure 1:
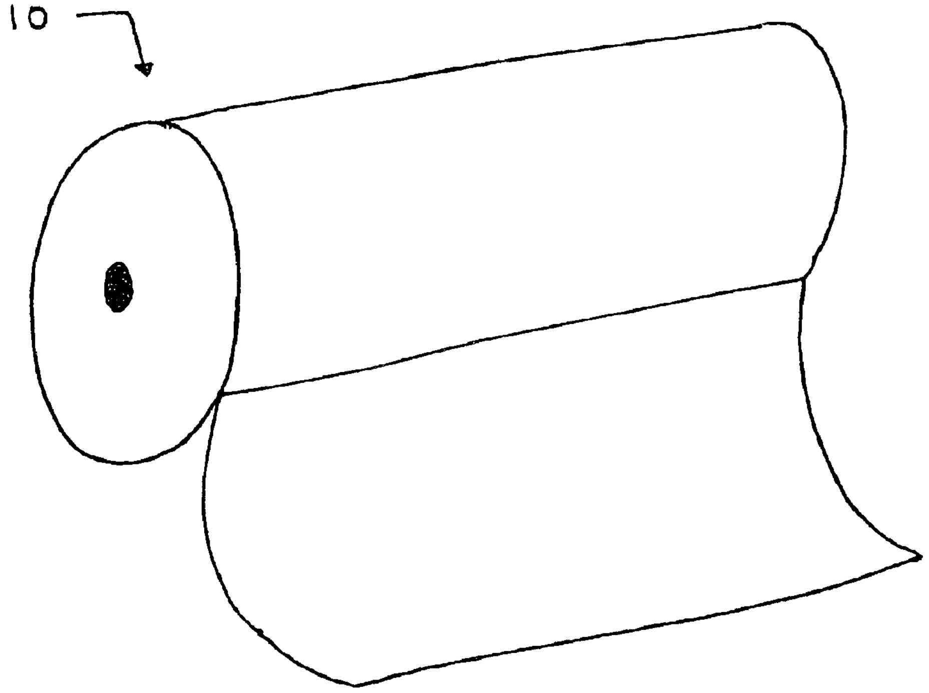
FIG. 1 is a perspective view of a roll of toilet paper or paper towels of the present invention.

The presently preferred embodiments of the invention will now be described by reference to the accompanying figures, wherein like elements are referred to by like numerals. Paper, such as facial tissue, toilet paper or paper towels, may come in a variety of forms for a paper supply, such as in the form of a roll, a stack, etc. Referring to FIG. 1, there is shown a perspective view of a roll of toilet paper, paper towel, or facial tissue 10 of the present invention. Alternatively, the toilet paper, paper towel, or facial tissue 10 may be in the form of sheets stacked on top of one another.

In one embodiment, as shown in FIG. 1, the toilet paper 10 is two-sided. On one side, there is information as shown in the figure. For example, the manufacturer of a brand of toilet paper may wish to increase brand identification by printing or embossing the toilet paper's trade name on each of the sheets of toilet paper. In this manner, information in the form of indicia may be conveyed to the toiler paper user. One method for embossing on the toilet paper is disclosed in U.S. Pat. No. 4,253,394, which is hereby incorporated by reference in its entirety.

Figure 2:
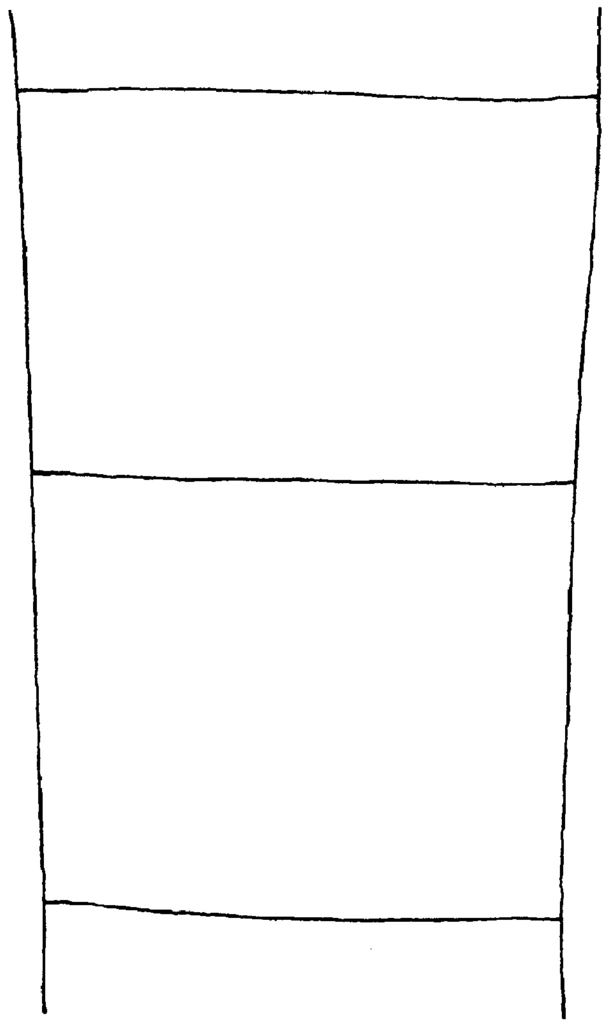
FIG. 2 is a top view of a plurality of sheets of toilet paper or paper towels.

Now referring to FIG. 2, there is shown a top view of a plurality of sheets of toilet paper. Each sheet has information thereon. The information may have similar information on each sheet (i.e., a similar pattern on each sheet). Alternatively, the sheets may comprise different patterns thereon. For example, there may be 4 different patterns that repeat every fourth sheet. A further embodiment may comprise information that extends over more than one sheet. As a result, a story or a series of other informational directions may be conveyed over a plurality of sheets to be described in more detail below. The means by which information is placed on the toilet paper may include embossing, printing, or other conventional means used in the printing or paper arts.

Figure 3:
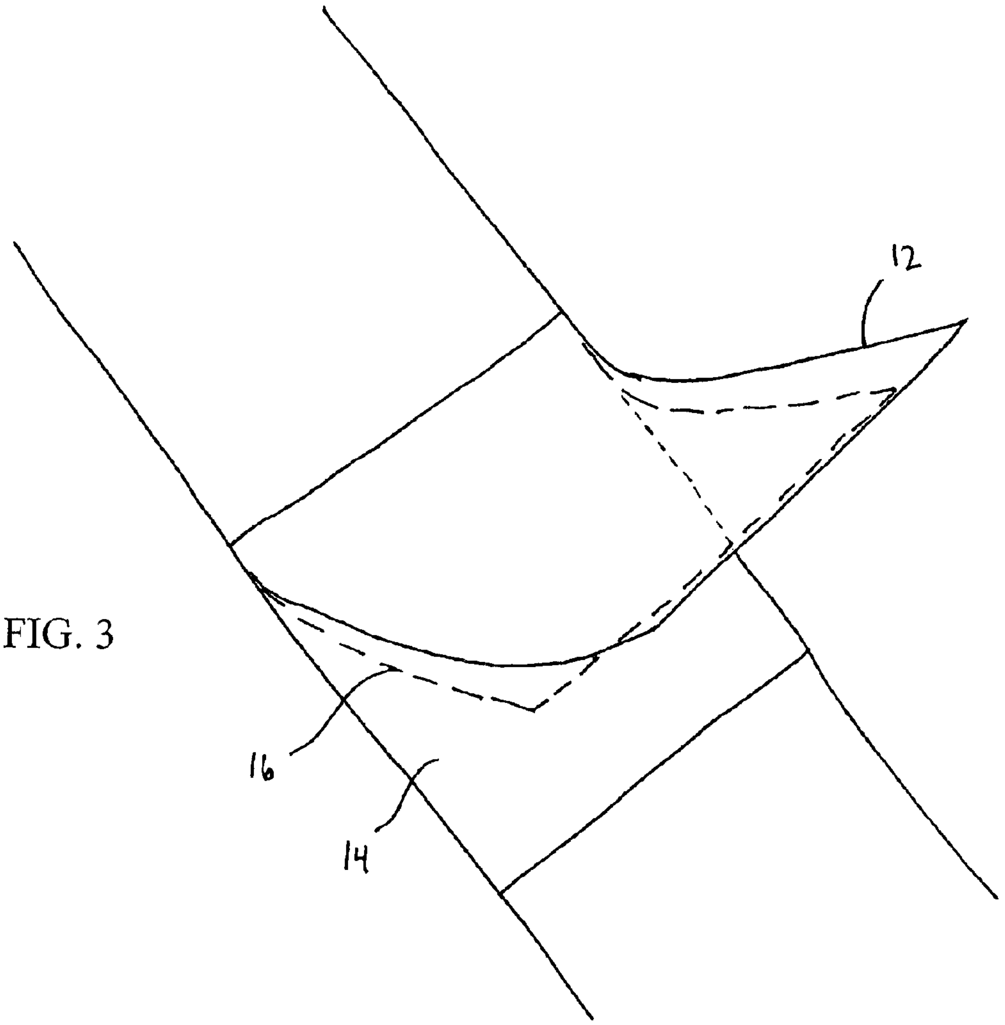
FIG. 3 is a perspective view of the toilet paper or paper towels incorporating yet a further aspect of the invention.

Referring to FIG. 3, there is shown a perspective view of the toilet paper, paper towel, or facial tissue incorporating yet a further aspect of the invention. The toilet paper comprises at least two distinct sheets 12, 14 wherein the upper sheet 12 is separable from the lower sheet 14. On the upper sheet 12 is information. The information may comprise stories, descriptions, trivia, games, crossword puzzles, symbols. This information may be in the form of advertisements, coupons, or other promotional materials. The information may further comprise games or prizes, such as stickers and crossword puzzles. The information may be removed by the toilet paper user for later use. Alternatively, as shown by the dotted line, a center sheet 16 may also be included so that the toilet paper used by the consumer will be two-ply in nature. As before, the upper sheet may then be torn off for use as a coupon or for other advertising purposes.

In still an alternate embodiment, the information may be incorporated as "inserts" within the roll of the toilet paper such that when the roll is dispensed, the inserts are likewise dispensed on a continual feed or interspersed basis. These inserts may comprise advertisements, coupons, or other promotional materials. The inserts may further comprise games or prizes, such as stickers and crossword puzzles. The inserts may be manufactured with a coating (e.g., plastic coating) in order to maintain proper hygiene.

When the user removes paper from the roll, a coupon or prize may likewise be dispensed. The coupon or prize information, in one embodiment, is held within the paper product by being sandwiched between sheets of paper (either in roll form or in stackable paper form). In one embodiment wherein the inserts are interspersed within a roll of toilet paper, the inserts are preferably distributed within the roll such that the roll has a uniform diameter (i.e., the inserts may be placed within the roll, spaced apart by a predetermined number of sheets of paper). Otherwise, the inserts may cause the roll to be lopsided. This dispersing may be done in a randomized manner such that the diameter of the paper roll is, on average, uniform. In another embodiment, the coupons or prizes or any such other insert may be placed on a continuous sheet that is placed in conjunction with the rolls of toilet paper. Thus, during manufacturing, as the toilet paper is rolled onto the parent spool (spool containing the final product), a separate continuous sheet housing the inserts is likewise rolled with the toilet paper such that the inserts are placed therein and the diameter of the paper roll is uniform. Spacing of the inserts can occur either in a randomized fashion, though placed at such distances to ensure a uniform diameter, or may be placed after a predetermined number of sheets (e.g., after every fourth sheet) in order to assist the young user to recognize the appropriate time to tear off the sheet.

Figure 4:
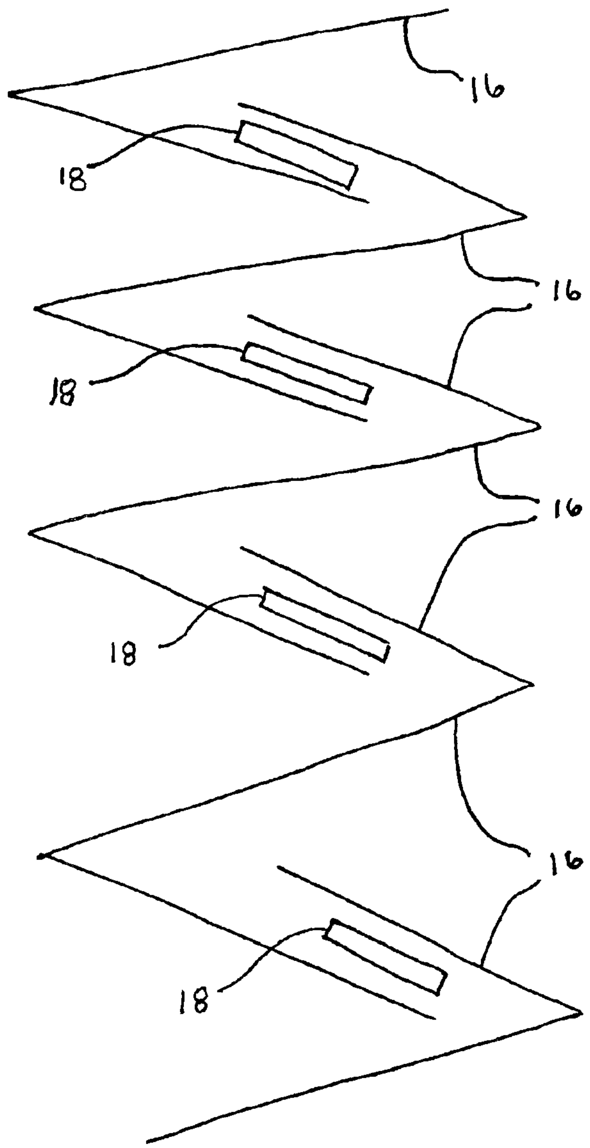
FIG. 4 is an expanded cross-sectional view of still another aspect of the invention, which utilizes interleaving sheets of paper.

Referring to FIG. 4, there is shown an expanded cross-sectional view of still another aspect of the invention that utilizes interleaving sheets 16 rather than rolled sheets of paper. Disposed between the interleaved sheets is a separate and distinct sheet 18 which may include information. As before, the information may comprise advertisements, coupons, or other promotional materials as well as games or prizes, such as stickers and crossword puzzles. In operation, a sheet of toilet paper 16 is removed from the stack whereupon the separate and distinct sheet 18 is removed as well. In this manner, for each dispense of a sheet, one additional sheet is dispensed.

Figure 5:
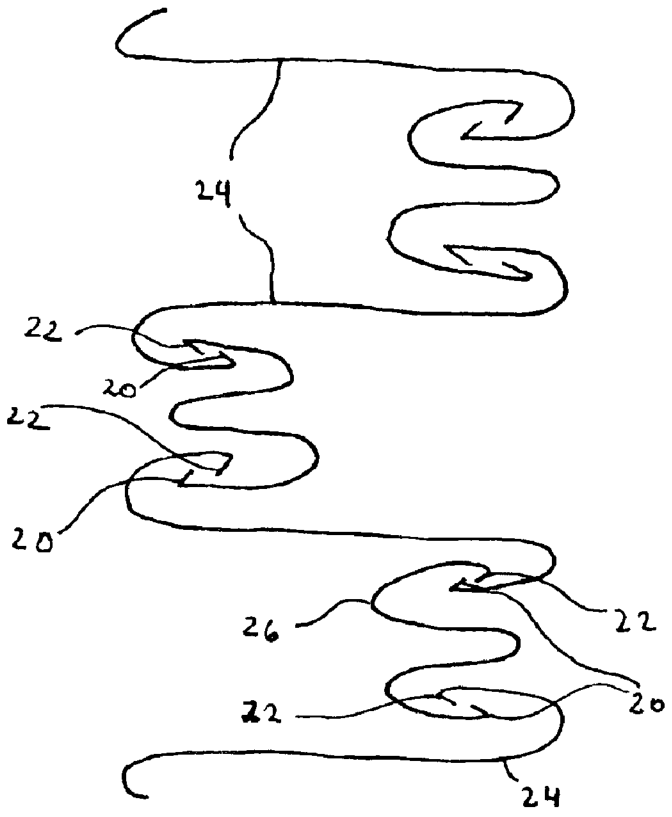
FIG. 5 is a more specific example of the invention shown in FIG. 4.

Referring to FIG. 5, there is shown a more specific example of the invention shown in FIG. 4. The sheet of toilet paper 24 comprises lips 20 that in turn are coupled to opposing lips 22 on the information sheet 26. Similarly, opposing lips 22 on the information sheet 26 are coupled to lips 20 on the next toilet paper sheet 24. As a result, when the user pulls on one toilet paper sheet, the user is provided with an information sheet. This process may then be repeated in order to obtain more sheets.

Figure 6:
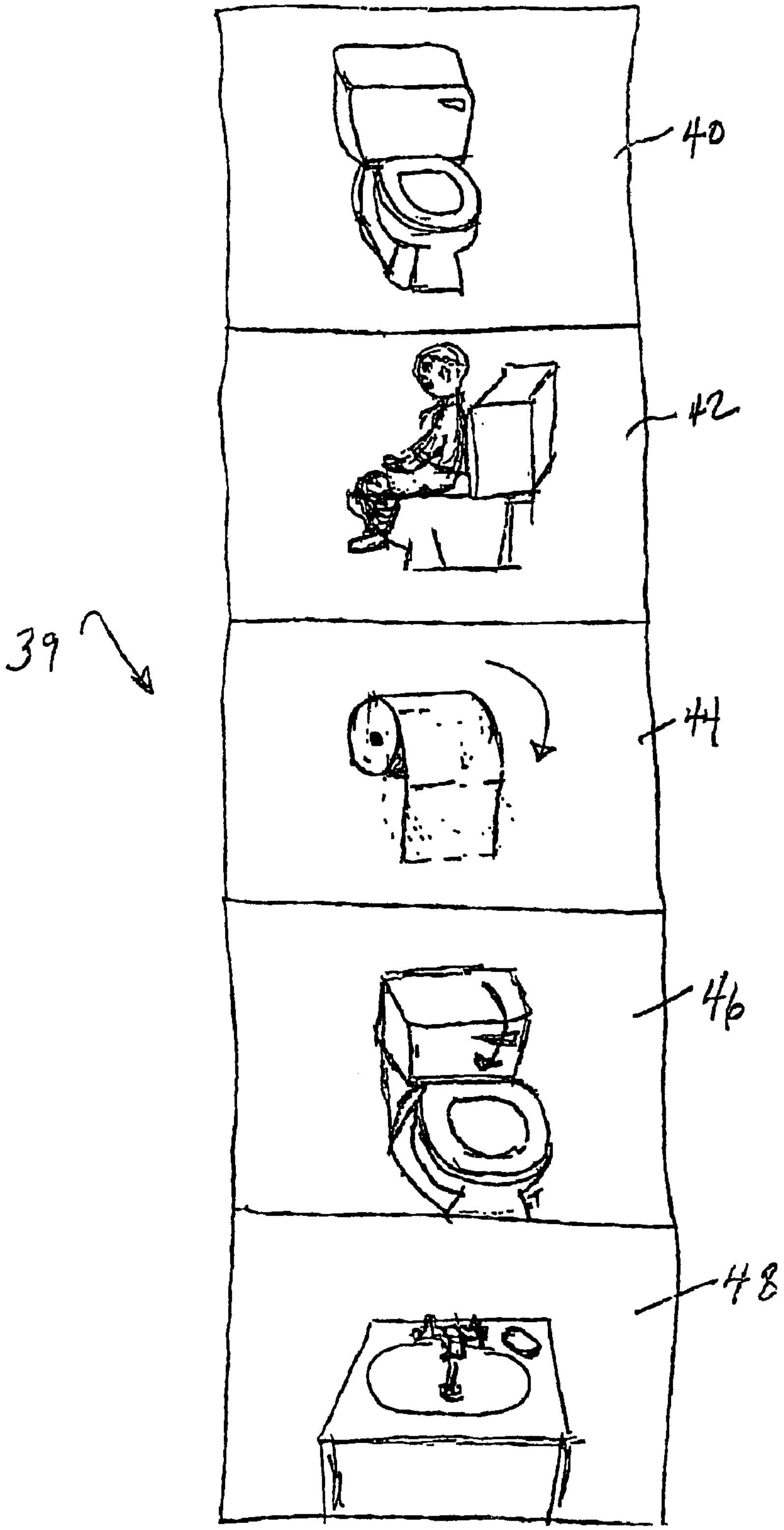
FIG. 6 is a perspective view of another aspect of the invention for conveying information, including information for potty training.

The invention can be directed to educational needs of children. Referring now to FIG. 6, there is shown one means for potty training children. Specifically, the toilet paper may be patterned such that a plurality of sheets describe or pictorially illustrate a story to help enable a child to properly be potty trained. The story set is such the at least two sheets comprise different information.

As an example of a given story set 39, in sheet 40, a toilet is shown. In sheet 42, a child sitting on the toilet is shown. In sheet 44, the toilet paper is rolled after the child uses the toilet. In sheet 46, the toilet is shown being flushed. Finally, in sheet 48, a sink is shown with soap for teaching the need to wash one's hands after using the toilet. Sheets 40 through 48 may then repeat thereafter until completion of the roll. As a result, a story set 39 may be provided over two or more sheets of paper.

Of course, other story sets 39 are contemplated by the present invention. The story set may comprise a pictorial story or written story that would be of interest to children (or adults for that matter) and would repeat thereafter until completion of the roll. Alternatively, the roll of toilet paper could comprise a plurality of different story sets 39, the given different story sets 39 repeating until the end of the roll.

The sets 39 may, for example, comprise stories of interest to children, historical information or other education information, including trivia information. Of course, the information may be of interest to adults and/or geared to adults. Further, the sets 39 may include a series of advertising information, coupons, or other publicity information geared to consumers. Preferably, the sets 39 comprise more than two sheets of different information thereon but less than a reasonable number of sheets having different information thereon to relay a given series of information for ease of manufacturing.

The sets 39 of information may be targeted to given audiences. For example, toilet paper at a sports stadium may be geared to individuals who attend such activities. Toilet paper at a shopping mall utilizing the present invention may have sets 39 of information geared to relevant consumers at the shopping mall. Toilet paper at a restaurant may have sets 39 of information directed to the restaurant, whether it is menu information, coupon information, or other advertising information.

Figure 7:
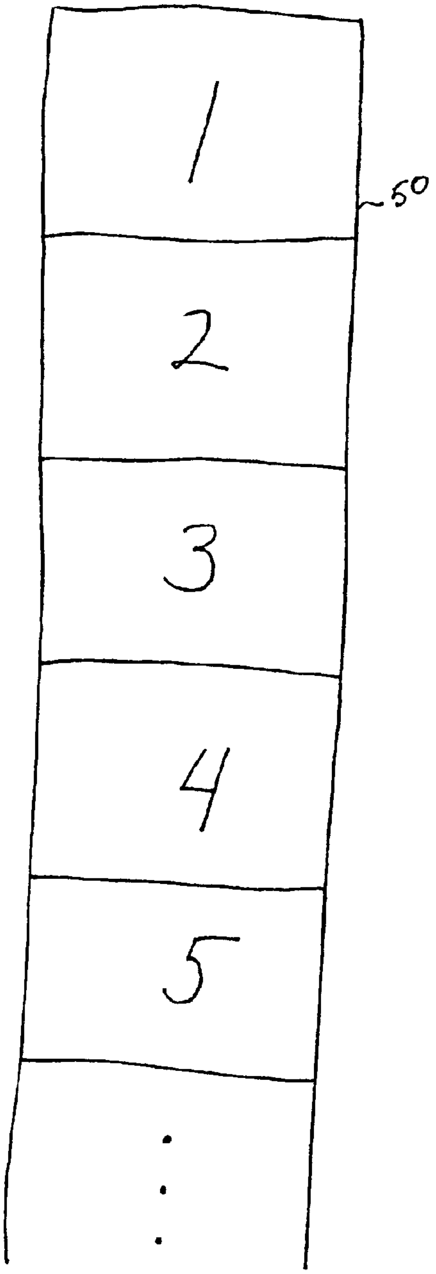
FIG. 7 is a perspective view of yet another aspect of the invention geared to number training.
Figure 8:
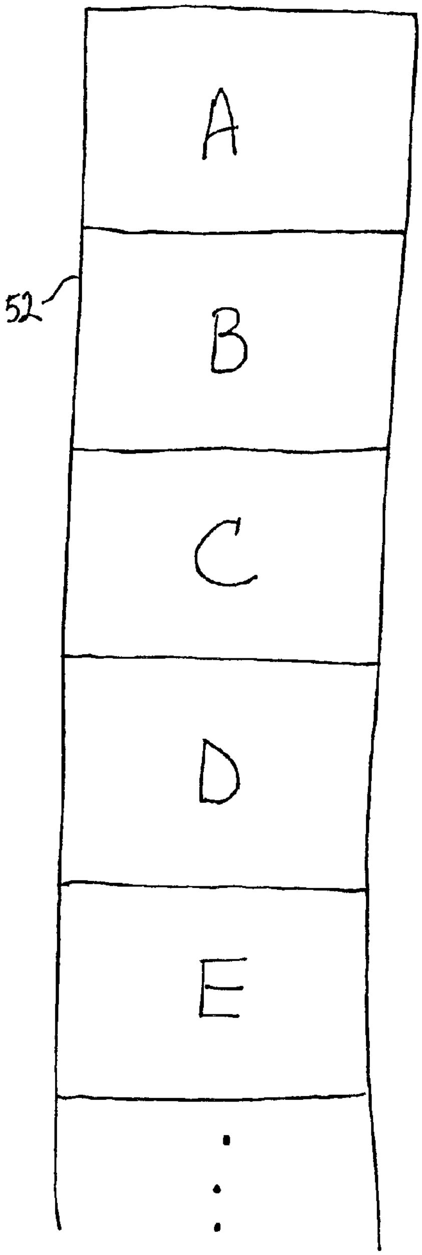
FIG. 8 is a perspective view of another aspect of the invention geared to letter training.

FIGS. 7 and 8 illustrate further examples of the educational value that toilet paper may have in accordance with the present invention. As shown in FIG. 7, the sheets may contain a sequence of numbers, one number per each given sheet 50 of paper. The numbers may, for example, repeat every ten numbers teaching children how to count to ten while further interesting them while using the restroom. Similarly, as shown in FIG. 8, the sheets 52 may contain letters of the alphabet, one letter per each given sheet 52 of paper. The letters could, for example, repeat from letter "A" to letter "Z". Of course, the sheet sets 39 may comprise one set of number sheets 50 alternated with one set of letter sheets 52, repeating until the end of the roll.

Figure 9:
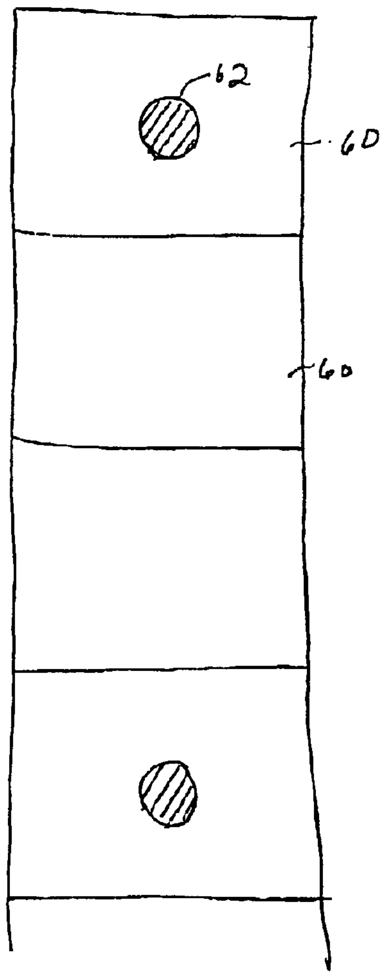
FIG. 9 is a perspective view of another aspect of the invention geared to potty training.
Figure 10:
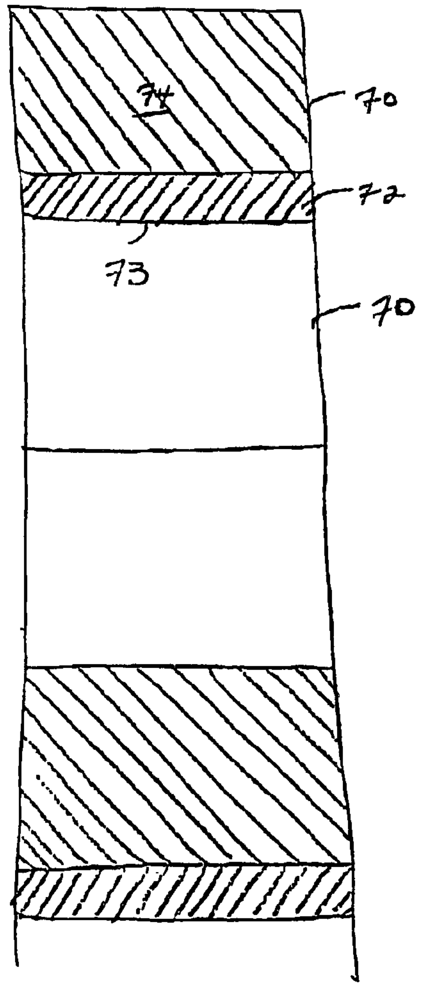
FIG. 10 is a perspective view of another aspect of the invention directed to potty training.

FIGS. 9 and 10 illustrate additional examples of the education value that toilet paper may have in accordance with the present invention for teaching children to apply the proper amount of toilet paper when using the restroom. Referring specifically to FIG. 9, there is shown a plurality of sheets 60 having a series of indicia 62 thereon every given number of sheets 60. A parent may then teach a child to pull the toilet paper every time the indicia 62 appears in order to utilize the proper amount of toilet paper per given wiping. The indicia may include advertisements, coupons, prizes (such as stickers and crossword puzzles), games or other promotional materials. The indicia may further be any design such as a geometric figure (circle, square, triangle, rectangle, etc.), a cartoon character, or any other figure or design of interest to children. Of course, the indicia 62 may be of one or a plurality of colors to interest a child in the potty training process.

Referring now to FIG. 10, there is shown an alternate embodiment for teaching children how to use the proper amount of toilet paper when using the restroom. The indicia 72 may run across the lower side 73 of a given sheet 70 of paper. The indicia 72 may, for example, comprise a band of a given color indicating to the child that it is the appropriate time to tear the toilet paper. The indicia 72 as before would repeat every given or predetermined number of sheets 70. Alternatively, the indicia may comprise the upper portion 74 of the sheet 70 or the total portion of a given sheet.

As one of ordinary skill in the art may appreciate, prizes or other inserts (e.g., coupons) may be incorporated with a given sheet set 39 as described in connection with FIG. 6. Preferably, the prize is provided with the last sheet of a given sheet set 39. For example, at the end of the story or a given sheet set 39, a prize may be included between the two plies of toilet paper as noted above. Alternatively, the prize or other inserts may be wrapped with a given roll of toilet paper having sheet sets 39 of information and prizes are provided between layers and appear as the user pulls the toilet roll. Preferably, the prizes or inserts are placed at the end of the information sheet set 39. As before, the prizes or inserts are preferably plastic coated, or are wrapped in plastic, to allow the user to wash them prior to use.

Figure 11:
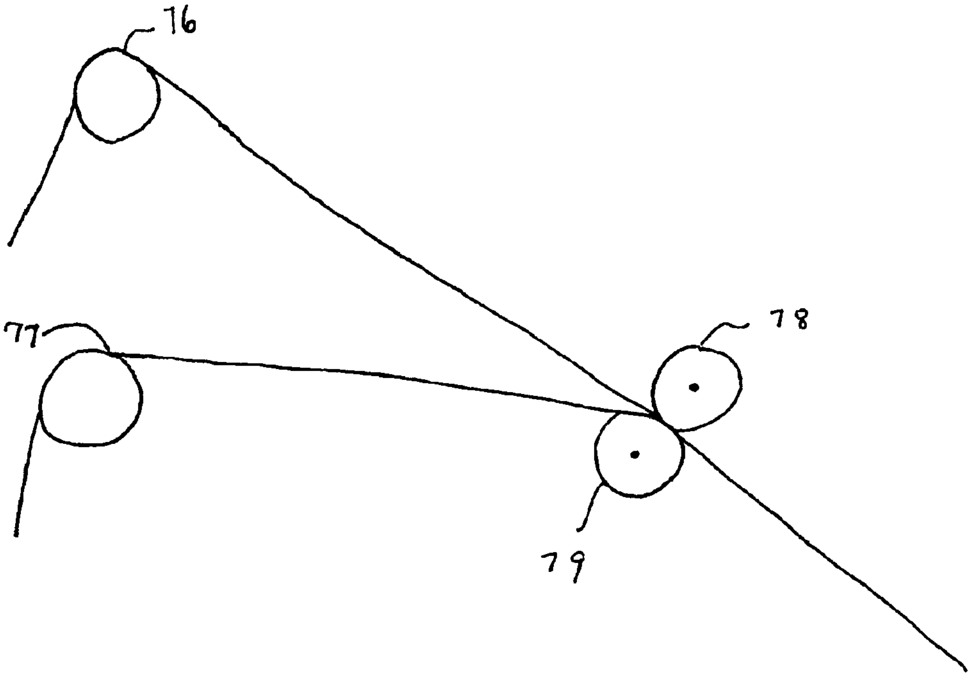
FIG. 11 is a cross-sectional view in accordance with one aspect of the invention of coupon insertion.

The incorporation of the prizes with the toilet paper may be performed by feeding 2 spools together into parent spool, with one spool being the toilet paper and the second spool being the prize, as shown in FIG. 11. The two spools 76, 77 are integrated using idler rolls 78, 79 so that the integration of the spools would be continuous; however, the spacing of the prizes would be either continuous or interspersed. If interspersed, the prizes would be placed at predetermined intervals (e.g., every third sheet) to assist child to know proper time to tear paper from roll.

Figure 12:
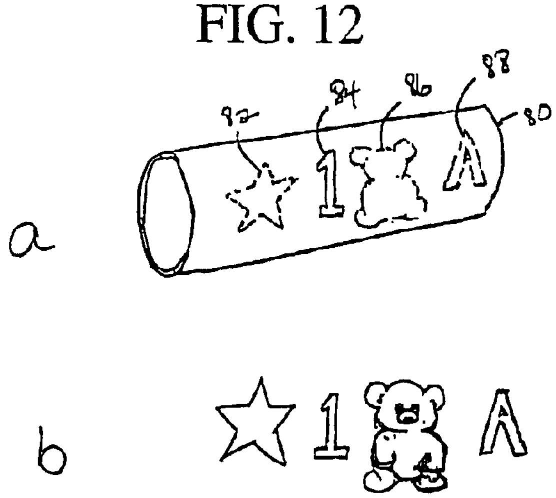
FIG. 12*a* is a perspective view in accordance with one aspect of the present invention of a spool incorporating cutouts.
FIG. 12*b* is a perspective view of the cutouts of FIG. 12*a*.

Now referring to FIG. 12, there is shown another aspect of the invention geared to using the spool 80 to convey information and/or provide toys or games. The spool 80 may comprise at least one cutout figure. Shown in FIG. 12*a* are four cutout figures 82, 84, 86, 88 within the spool 80. FIG. 12*b* shows the removed cutout figures 82, 84, 86, 88. The cutouts may be a design of interest to children why potty training such as a star 82 or a teddy bear 86. Children being potty trained may collect such cutout figures. By completing a roll of toilet paper, they have an end prize of the cutout figure.

The spool 80 may appropriately be lined on the inner side with an adhesive layer, not shown, and a release backing thereon as is commonly used in the label industry. The user may then cutout the prize, remove the backing thereon, and apply the prize (e.g., star, bear) to a board not shown in order to reinforce the child and the potty training process. Similarly, the stickers described earlier may also be applied to a board. The child will then be impressed with his/her efforts by seeing all of the prizes on the board.

The cutout figures may also represent examples of what was learned when pulling the toilet paper. For example, utilizing the aspects illustrated in FIG. 7, a child may learn the numbers one through ten. The roll 80 could provide cutout figures embodying numbers such as 84, reinforcing the learning process. Similarly, utilizing the aspects illustrated in FIG. 8, a child may learn the alphabet. The roll 80 could provide cutout figures embodying letters such as 88, reinforcing the learning process.

Figure 13:
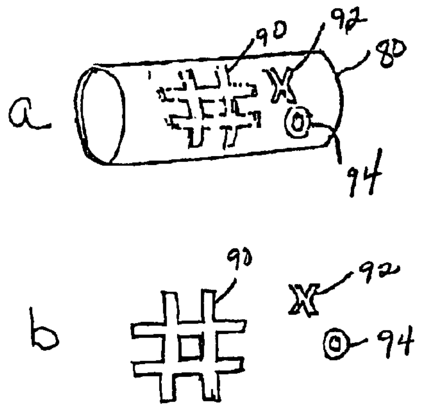
FIG. 13*a* is a perspective view in accordance with another aspect of the present invention of a spool incorporating cutouts.
FIG. 13*b* is a perspective view of the cutouts of FIG. 13*a*.

The cutout figures may also represent a game. For example, referring now to FIG. 13*a*, there is shown a spool 80 having a tic-tac-toe board cutout 90, an "X" 92 (only one shown), and an "O" 94 (only one shown). Referring also to FIG. 13*b*, the board cutout 90, the "X" 92 and the "O" 94 are shown. As a result, one can utilize the spool 80 to either reinforce information provide on the toilet paper or provide game activity for children.

Figure 14:
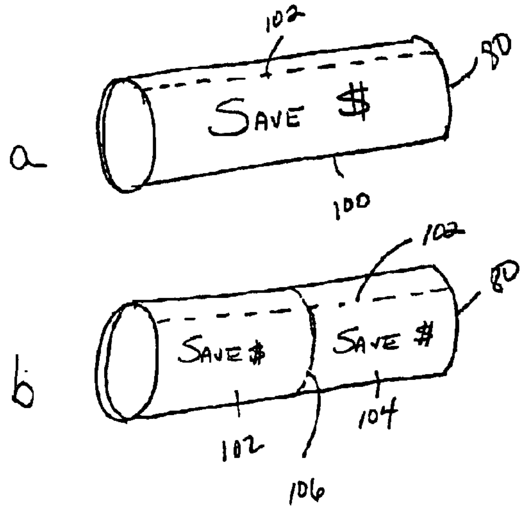
FIGS. 14*a* and 14*b* provide a perspective view of yet another embodiment of the present invention of a spool incorporating cutouts.

Referring now to FIG. 14, there is shown another aspect of the invention related to utilizing the spool 80 for advertising purposes. A coupon or any other information 100 may be imprinted on the spool 80. As shown in FIG. 14*a*, the spool further comprises a tear line 102 to allow the user to neatly utilize the coupon or information 100.

Referring also to FIG. 14*b*, there may be more than one coupon provided on the spool 80. Specifically there are shown two coupons or other information 102, 104 although any number of coupons may be provided. As before there may be a tear line 102. There may also be a tear line 106 between each of the coupons 102, 104 to allow for proper tearing.

The toilet paper may comprise advertising or other information regarding a product. Coupons 100, 102, 104 may be provided at the end of the roll to promote a given product or provide information to the consumer.

Although the spools contemplated by this invention may be made of paper as is generally used in the industry, the spool may be made of light-weight plastic of a kind allowing the user to easily tear the coupons 100 or cutout figures (e.g., 82, 84, 86, 88, 90) at the tear line for sanitary purposes (i.e., allowing the consumer to wash the coupons or figures with soap and water before use). Alternatively, the spool may be paper coated in plastic for sanitary purposes as well.

Although the present invention was generally described in relation to toilet paper, it may also apply to paper towels and facial tissues, whether in rolled or interleaved format.

It is intended that the foregoing detailed description be regarded as illustrative rather than limiting and that it is understood that the following claims, including all equivalents, are intended to define the scope of the invention.

What is claimed is:

1. A paper supply comprising at least a first sheet and a second sheet forming a plurality of sheets, each of said sheets comprising a top and bottom layer, wherein an insert is provided only in said first sheet of said plurality of sheets between said top and bottom layer and not in said second sheet of said plurality of sheets.

2. The invention of claim 1 wherein said paper supply is a paper roll and each of said sheets is separated by perforations.

3. The invention of claim 1 wherein said insert is one of a coupon, advertisement, and prize.

4. The invention of claim 2 wherein said at least first and second sheets of said plurality of sheets comprise different patterns.

5. The invention of claim 2 wherein said insert is provided at a last sheet of said plurality of sheets.

6. The invention of claim 2 further comprising a paper spool for use with said paper roll comprising at least one cutout containing perforations around said cutout for removing said cutout from said spool.

7. The invention of claim 4 wherein said patterns of said plurality of sheets repeat at least once.

8. The invention of claim 4 wherein said patterns comprise one of numbers and letters.

9. The invention of claim 4 wherein said patterns convey a story.

10. The invention of claim 7 wherein said patterns comprise one of drawings and characters for educating a user of said paper roll.

11. The invention of claim 10 wherein said patterns comprise drawings for educating a user to use a toilet.

12. The invention of claim 11 wherein said patterns further comprise drawings for educating said user to wash its hands after using the toilet.

13. The invention of claim 6 wherein said cutout comprises one of a letter, number, and figure.

14. The invention of claim 6 wherein said cutout comprises a game.

15. The invention of claim 6 wherein said cutout comprises one of a coupon, advertisement, and prize.

16. The invention of claim 6 wherein said cutout reinforces information provided in said plurality of sheets.

17. The invention of claim 14 wherein said game comprises tic-tac-toe.

* * * * *